(12) United States Patent
Mai (10) Patent No.: US 12,045,538 B1
(45) Date of Patent: Jul. 23, 2024

(54) MULTI-FUNCTIONAL CONSOLE HAVING DOUBLE SOUND CARD AND WIRELESS NOISE REDUCTION AND VIDEO CAPTURE CARD

(71) Applicant: Shenzhen Xunweijia Technology Development Co., Ltd., Shenzhen (CN)

(72) Inventor: Qibin Mai, Gaoyao (CN)

(73) Assignee: Shenzhen Xunweijia Technology Development Co., Ltd., Shenzhen (CN)

( * ) Notice: Subject to any disclaimer, the term of this patent is extended or adjusted under 35 U.S.C. 154(b) by 0 days.

(21) Appl. No.: 18/433,317

(22) Filed: Feb. 5, 2024

(30) Foreign Application Priority Data

Jan. 24, 2024 (CN) .......................... 202420174216.9

(51) Int. Cl.
*G06F 3/16* (2006.01)
*G10K 11/178* (2006.01)

(52) U.S. Cl.
CPC .............. *G06F 3/162* (2013.01); *G06F 3/165* (2013.01); *G10K 11/17853* (2018.01)

(58) Field of Classification Search
CPC ............. G06F 3/165; G06F 3/16; G06F 3/162
USPC ......................................................... 700/94
See application file for complete search history.

(56) References Cited

U.S. PATENT DOCUMENTS

| | | | |
|---|---|---|---|
| 2010/0037755 A1* | 2/2010 | McMillen | G10H 1/342 84/645 |
| 2015/0134869 A1* | 5/2015 | Graham | G06F 1/1698 710/304 |
| 2016/0142648 A1* | 5/2016 | Gopinath | H04N 21/42204 348/705 |
| 2018/0316876 A1* | 11/2018 | Gopinath | H04N 21/42204 |
| 2018/0353856 A1* | 12/2018 | Karacal | A63F 13/87 |

FOREIGN PATENT DOCUMENTS

| | | |
|---|---|---|
| CN | 208351449 U | 1/2019 |
| CN | 210958458 U | 7/2020 |
| CN | 116501283 A | 7/2023 |

* cited by examiner

*Primary Examiner* — Alexander Krzystan
(74) *Attorney, Agent, or Firm* — Nitin Kaushik (57) ABSTRACT

The present invention discloses a multi-functional console having a double sound card and a wireless noise reduction and video capture card, which falls within the technical field of multimedia equipment. The present invention includes a main chip, a control panel, a power supply unit and an interactive panel, wherein at least two sound cards are provided in the main chip which is successively connected to a microphone amplifier circuit and a microphone input circuit, and the microphone input circuit is connected to a noise reduction module, a wireless microphone receiving circuit and a compound interface; the control panel is provided with a plurality of knobs, keys and indicator lamps electrically connected to the main chip, the interactive panel is mounted with a plurality of input and output sockets electrically connected to the main chip, and the main chip is also connected to a storage module and a wireless communication module.

9 Claims, 9 Drawing Sheets

MULTI-FUNCTIONAL CONSOLE HAVING DOUBLE SOUND CARD AND WIRELESS NOISE REDUCTION AND VIDEO CAPTURE CARD

TECHNICAL FIELD

The present invention falls within the technical field of multimedia equipment, and in particular relates to a multi-functional console having a double sound card and a wireless noise reduction and video capture card.

BACKGROUND

With the continuous development of society, people's requirements are increasing, especially the game enthusiasts and anchors have higher and higher requirements for the game and live equipment which is more and more convenient to use. The functional requirements for the console also require more customization and personalization. The console is to amplify, mix, distribute, modify the sound quality and process the sound effect of multiple input signals, and is an important equipment in modern radio broadcast, game and live broadcast systems, and the current sound console has the following disadvantages.

Firstly, the existing sound console has only one single sound card, and since there is only one computer output mapping device, it cannot individually allocate the voice of the networked teammates and the voice of the game background, resulting in that the voice of the game background and the voice of the teammates cannot be individually adjusted, resulting in that the volume size of the voice and the background sound increases with the volume size of a headphone, and the proportion cannot be freely controlled, thus not meeting the functional requirements and personalized requirements of the enthusiasts;

Secondly, the existing sound console does not have a wireless function, and is difficult to match with a wireless headphone and a wireless headset on the market, cannot be used at a long distance, is bound by a wire, is inconvenient to operate, and reduces the feeling of experience;

Thirdly, since the microphone and the loudspeaker box are used in the same environment and in the same space, it is easy to cause the loudspeaker box to turn up when the microphone turns up, which will also cause the microphone to pick up the sound of the loudspeaker box, so that the teammate will hear the sound spoken by the user and the sound coming out of the loudspeaker box mixed together, which is unclear, and even cause the loudspeaker box to whistle:

Fourthly, it cannot provide strange sound effects (such as male voice turning to female voice, vice versa, etc.), and the output cannot have an EQ effect and virtual effect change;

Fifthly, it does not have video capture function and is not user-friendly.

In view of the above shortcomings, the present application provides a multi-functional console having a double sound card and a wireless noise reduction and video capture card.

SUMMARY

An objective of the present invention is to provide a multi-functional console having a double sound card and a wireless noise reduction and video capture card, which aims to solve the problems of existing sound console having only a single sound card, no wireless function, no video capture function, etc. In order to achieve the objective, the technical solution adopted by the present invention is: a multi-functional console having a double sound card and a wireless noise reduction and video capture card is used, specifically including a main chip, a control panel, a power supply unit and an interactive panel, where at least two sound cards are provided in the main chip which is successively connected to a microphone amplifier circuit and a microphone input circuit, and the microphone input circuit is connected to a noise reduction module, a wireless microphone receiving circuit and a compound interface; the console is provided with a plurality of knobs, keys and indicator lamps electrically connected to the main chip, the interactive panel is mounted with a plurality of input and output sockets electrically connected to the main chip, and the main chip is also connected to a storage module and a wireless communication module. The main chip is electrically connected to a video capture chip, and the video capture chip is connected to a video input and output circuit. With this technical solution, the double sound card, the wireless communication function, the noise reduction function and the video capture function are effectively and highly integrated to meet the existing user requirements.

According to further description of the above-mentioned solution, an input dynamic indicator lamp and an output dynamic indicator lamp are respectively provided on the top of the control panel for indicating an input volume size and an output volume size; a left side of the console is provided with a compound knob, an OUTPUT knob, a MIC knob and an AUX knob, where the compound knob adjusts outputs of two sound cards in an equal proportion and then outputs via an ear amplifier chip circuit; when an indication point on the compound knob is aligned with the middle position, the sounds output by fifine Game and fifine Chat devices mapped by the computer are both proportional maximum sounds; when the compound knob is rotated in the direction of GAME, the sound output of fifine Game device does not change, but the sound of fifine Chat device is attenuated; when the compound knob is rotated in the CHAT direction, the output volume size of the fifine Chat device does not change, but the sound of the fifine Game device is attenuated. The OUTPUT knob controls the total output volume and mute; the MIC knob controls the input volume of a microphone and headset input channel; and the AUX knob controls the fiber or AUX cable input volume size.

More preferably, the OUTPUT knob, the MIC knob and the AUX knob all have a one-key mute function, and the OUTPUT knob, the MIC knob and the AUX knob all have mute and volume size indicator lamps below. Four red lights are placed below the knob to indicate the mute state, and the red lights are lighted in the mute state. When the knob is rotated, the dynamic indicator lamp position displays the size of the volume adjustment position.

More preferably, an upper right side of the control panel is provided with a VOICE key for switching the voice-changing effect, and the periphery of the VOICE key surrounds a plurality of sound-changing indicator lamps, and there are at least 8 sound-changing effects, including MALE, FEMALE, ROBOT, MEGAPHONE, ELDER. BABY. MONSTER and AUTOTUNE.

Further, a lower right side of the control panel is provided with a CUSTOM key, a MIC key, a phantom power key, a virtual key and an EQ equalization key, where the CUSTOM key is provided with a plurality of keys for recording and playing back audio and the recorded audio is stored in a storage module. The MIC key is used for monitoring a microphone input, the phantom power key is used for switching power supply and power interruption to a compound interface, the virtual key is used for controlling virtual output sound effects of a headphone and a headset out, the EQ equalization key is used for switching an EQ mode, and a mode indicator lamp is provided beside the EQ equalization key.

Further, a shift switch is provided beside the compound interface of the interactive panel for the capacitor microphone and the dynamic microphone, and the compound interface uses a Cannon/6.35 combination interface, and can connect the capacitor microphone and the dynamic microphone of the XLR externally. The interactive panel is further provided with a headset interface, an analog audio in, an analog audio out, an optical in, a TYPE-C socket, a toggle switch and a light key; the optical in is used for connecting the PS4 and the TV; the TYPE-C socket is used for supplying power; and the toggle switch is used for switching a double sound card mode and a single sound card mode of a sound card.

More preferably, the noise reduction module is provided with a noise reduction key, and the noise reduction module performs filtering processing according to the electrical signal of the microphone input circuit and is used for reducing filtering environmental noise and loudspeaker sound, and effectively solving the problem that the microphone picks up the sound of the sound box during actual use, so that the teammate will hear the sound spoken by the user and the sound coming out of the loudspeaker box mixed together, which is unclear, and even cause the loudspeaker box to whistle.

More preferably, the multi-functional console is further provided with a plurality of LED lamps connected to the lamp control chip, and has a RGB ambient lamp effect.

Compared to the prior art, the present invention has the following advantageous effects:
1. Integrating a wireless microphone and a video capture card, and at the same time, the microphone having a noise reduction function;
2. Solving the problem that the current sound console in the market does not have the function of double sound card output, and the volume proportion of an output device entity cannot be adjusted, and solving the problem that a user cannot proportionally adjust the voice of a teammate and the sound of a game background when playing a game;
3. On the basis of the double sound card, sound change, RGB light effect, and auxiliary input are added to improve user experience;
4. The problem of connecting multiple external devices is solved, and a video capture card, a wireless noise reduction microphone and a wireless headphone communication module are integrated.

Reference numerals are as follows:
1. control panel; 11. compound knob; 12. OUTPUT knob; 13. MIC knob; 14. AUX knob; 15. VOICE key; 16. CUSTOM key; 171. MIC bond; 172. phantom power key; 173. virtual key; 174. EQ equalization key; 181. input dynamic indicator lamp; 182. output dynamic indicator lamp; 183. sound-changing indicator lamp; 184. mode indicator lamp; 2. interactive panel; 21. compound interface; 211. shift switch; 22. headset interface; 23. analog audio in; 24. analog audio out; 25. optical in; 26. TYPE-C socket; 27. toggle switch; 28. light key.

DETAILED DESCRIPTION OF THE EMBODIMENTS

To facilitate an understanding of the present invention, a more complete description of the present invention will be rendered by reference to the appended drawings. Preferred embodiments of the present invention are shown in the accompanying drawings. The present invention may, however, be embodied in many different forms and should not be construed as limited to the embodiments set forth herein. Rather, these embodiments are provided so that the disclosure of the present invention will be thorough and complete.

The solution of this patent is described in further detail below with reference to specific embodiments.

Figure 1:
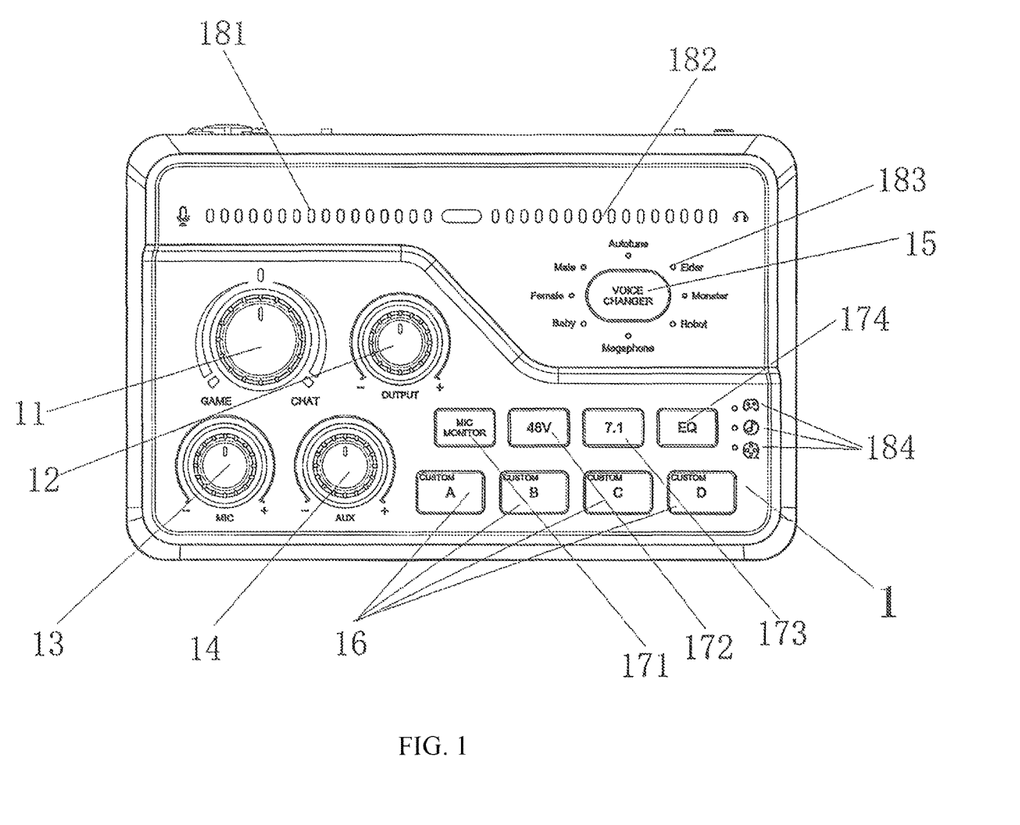
FIG. 1 is a schematic diagram of a control panel according to an embodiment of the present invention.

With reference to FIG. 1. FIG. 2, FIG. 3A, FIG. 3B, FIG. 4, FIG. 5A, FIG. 5B, FIG. 5C, FIG. 5D. in order to solve the problem that the existing sound console and console have few functions, no noise reduction, no video capture, etc., the present invention provides a multi-functional console having a double sound card and a wireless noise reduction and video capture card is used, specifically including a main chip 1, a console, a power supply unit and an interactive panel 2, where at least two sound cards are provided in the main chip which is successively connected to a microphone amplifier circuit and a microphone input circuit, and the microphone input circuit is connected to a noise reduction module, a wireless microphone receiving circuit and a compound interface 21; the control panel 1 is provided with a plurality of knobs, keys and indicator lamps electrically connected to the main chip, the interactive panel 2 is mounted with a plurality of input and output sockets electrically connected to the main chip, and the main chip is also connected to a storage module and a wireless communication module. The main chip is electrically connected to a video capture chip, and the video capture chip is connected to a video input and output circuit. With this technical solution. the double sound card, the wireless communication function, the noise reduction function and the video capture function are effectively and highly integrated to meet the existing user requirements.

As shown in FIG. 1, an input dynamic indicator lamp 181 and an output dynamic indicator lamp 182 are respectively provided on the top of the control panel 1 for indicating an input volume size and an output volume size; a left side of the control panel 1 is provided with a compound knob 11, an OUTPUT knob 12, a MIC knob 13 and an AUX knob 14, where the compound knob 11 adjusts outputs of two sound cards in an equal proportion and then outputs via an ear amplifier chip circuit; when an indication point on the compound knob 11 is aligned with the middle position, the sounds output by fifine Game and fifine Chat devices mapped by the computer are both proportional maximum sounds; when the compound knob 11 is rotated in the direction of GAME. the sound output of fifine Game device does not change, but the sound of fifine Chat device is attenuated; when the compound knob 11 is rotated in the CHAT direction, the output volume size of the fifine Chat device does not change, but the sound of the fifine Game device is attenuated. The OUTPUT knob 12 controls the total output volume and mute; the MIC knob 13 controls the input volume of a microphone and headset input channel; and the AUX knob 14 controls the fiber or AUX cable input volume size.

As shown in FIG. 1, the OUTPUT knob 12, the MIC knob 13 and the AUX knob 14 all have a one-key mute function, and the OUTPUT knob 12, the MIC knob 13 and the AUX knob 14 all have mute and volume size indicator lamps below. Four red lights are placed below the knob to indicate the mute state, and the red lights are lighted in the mute state. When the knob is rotated, the dynamic indicator lamp position displays the size of the volume adjustment position.

As shown in FIG. 1, an upper right side of the control panel 1 is provided with a VOICE key 15 for switching the voice-changing effect, and the periphery of the VOICE key 15 surrounds a plurality of sound-changing indicator lamps 183, and there are at least 8 sound-changing effects, including MALE, FEMALE, ROBOT, MEGAPHONE, ELDER, BABY, MONSTER and AUTOTUNE.

As shown in FIG. 1, a lower right side of the control panel 1 is provided with a CUSTOM key 16, a MIC key 171, a phantom power key 172, a virtual key 173 and an EQ equalization key 174, where the CUSTOM key 16 is provided with a plurality of keys for recording and playing back audio, and the recorded audio is stored in a storage module. The MIC key 171 is used for monitoring a microphone input, the phantom power key 172 is used for switching power supply and power interruption to a compound interface 21, the virtual key 173 is used for controlling virtual output sound effects of a headphone and a headset out, the EQ equalization key 174 is used for switching an EQ mode, and a mode indicator lamp 184 is provided beside the EQ equalization key 174, and the EQ equalization key 174 switches a cycle; Moderate-Game-Music-Movie mode.

Figure 2:
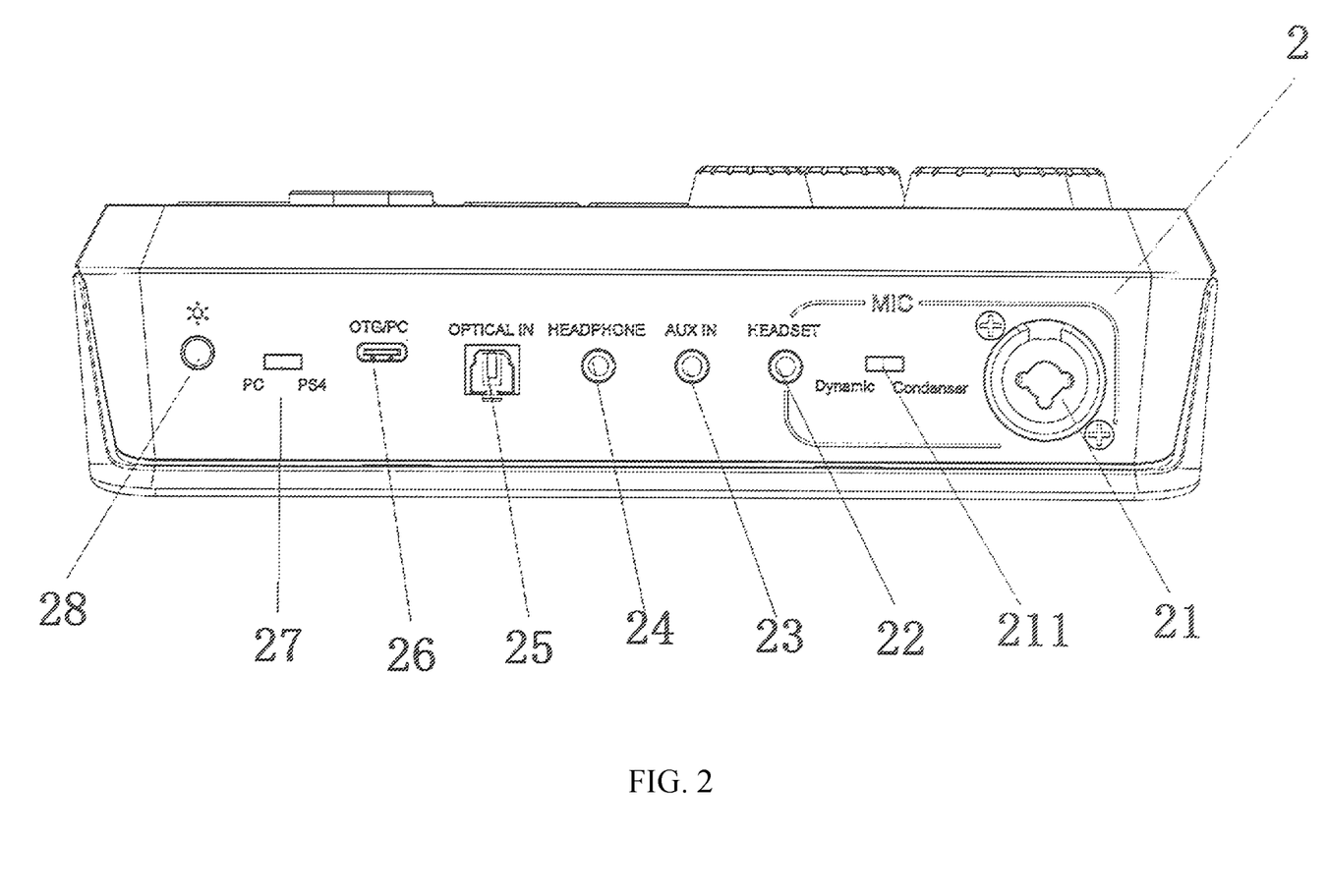
FIG. 2 is a schematic diagram of an interactive panel according to an embodiment of the present invention.

As shown in FIG. 2, a shift switch 211 is provided beside the compound interface 21 of the interactive panel 2 for the capacitor microphone and the dynamic microphone, and the compound interface 21 uses a Cannon/6.35 combination interface, and can connect the capacitor microphone and the dynamic microphone of the XLR externally. The interactive panel 2 is further provided with a headset interface 22, an analog audio in 23, an analog audio out 24. an optical in 25, a TYPE-C socket 26, a toggle switch 27 and a light key 28; the optical in 25 is used for connecting the PS4 and the TV; the TYPE-C socket 26 is used for supplying power; and the toggle switch 27 is used for switching a double sound card mode and a single sound card mode of a sound card.

The noise reduction module is provided with a noise reduction key, and the noise reduction module performs filtering processing according to the electrical signal of the microphone input circuit and is used for reducing filtering environmental noise and loudspeaker sound, and effectively solving the problem that the microphone picks up the sound of the sound box during actual use, so that the teammate will hear the sound spoken by the user and the sound coming out of the loudspeaker box mixed together, which is unclear, and even cause the loudspeaker box to whistle. The multi-functional console is further provided with a plurality of LED lamps connected to the lamp control chip, and has a RGB ambient lamp effect.

In order that the disclosure of the present invention may be more fully understood, the principles thereof will be further explained below in connection with the mode of use.

Figure 3A:
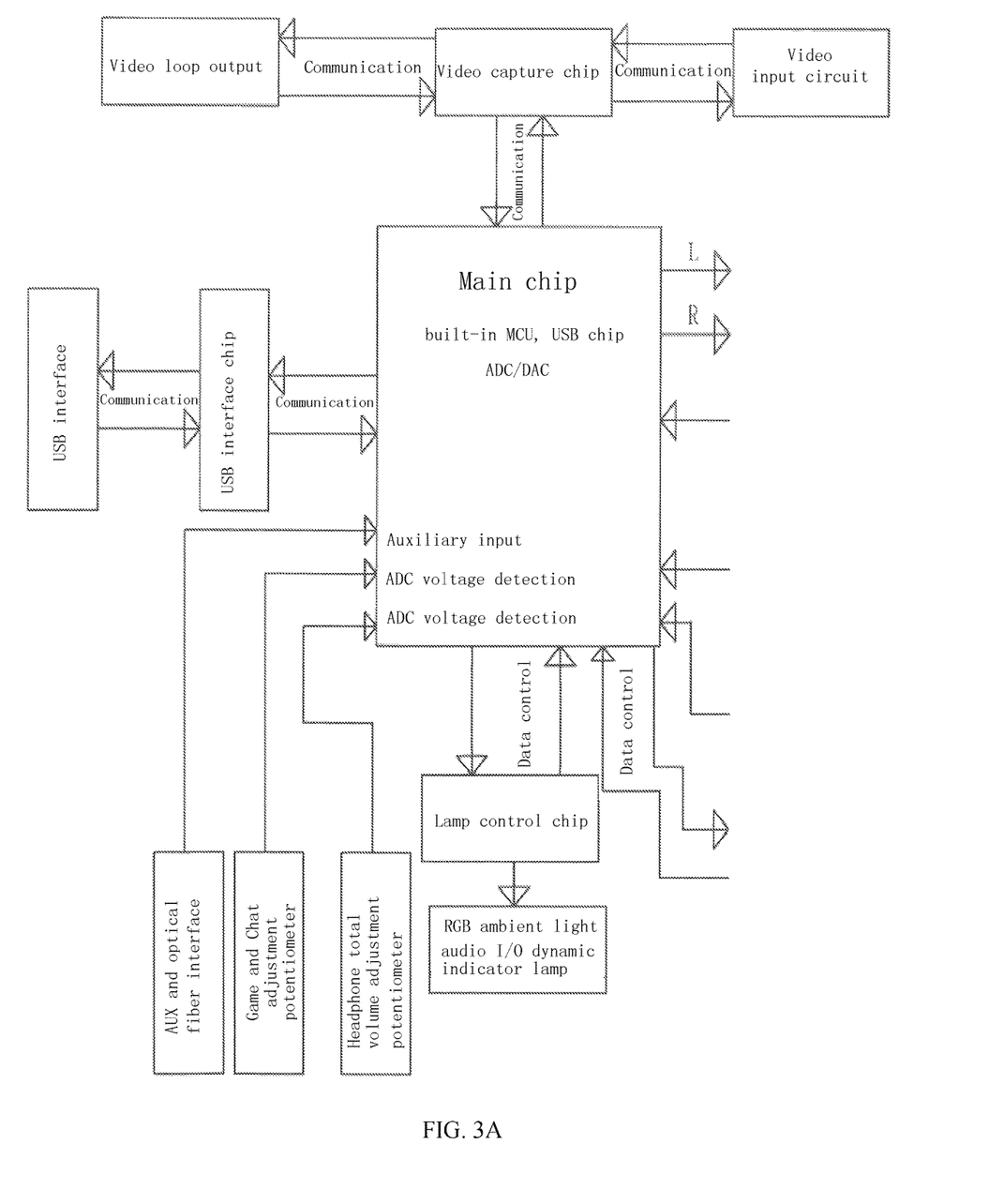
FIG. 3A and FIG. 3B is a schematic diagram according to an embodiment of the present invention.
Figure 3B:
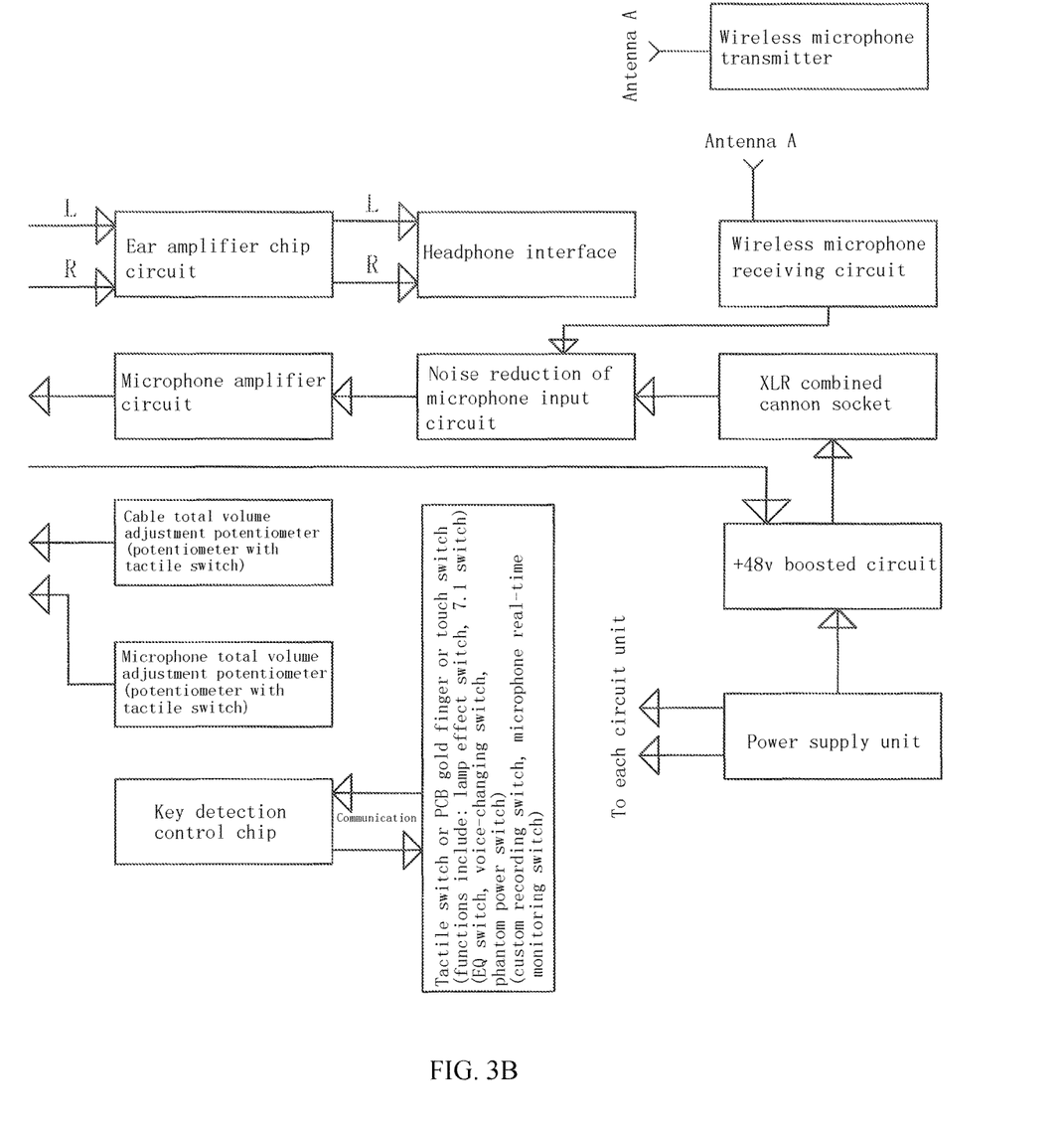
Figure 4:
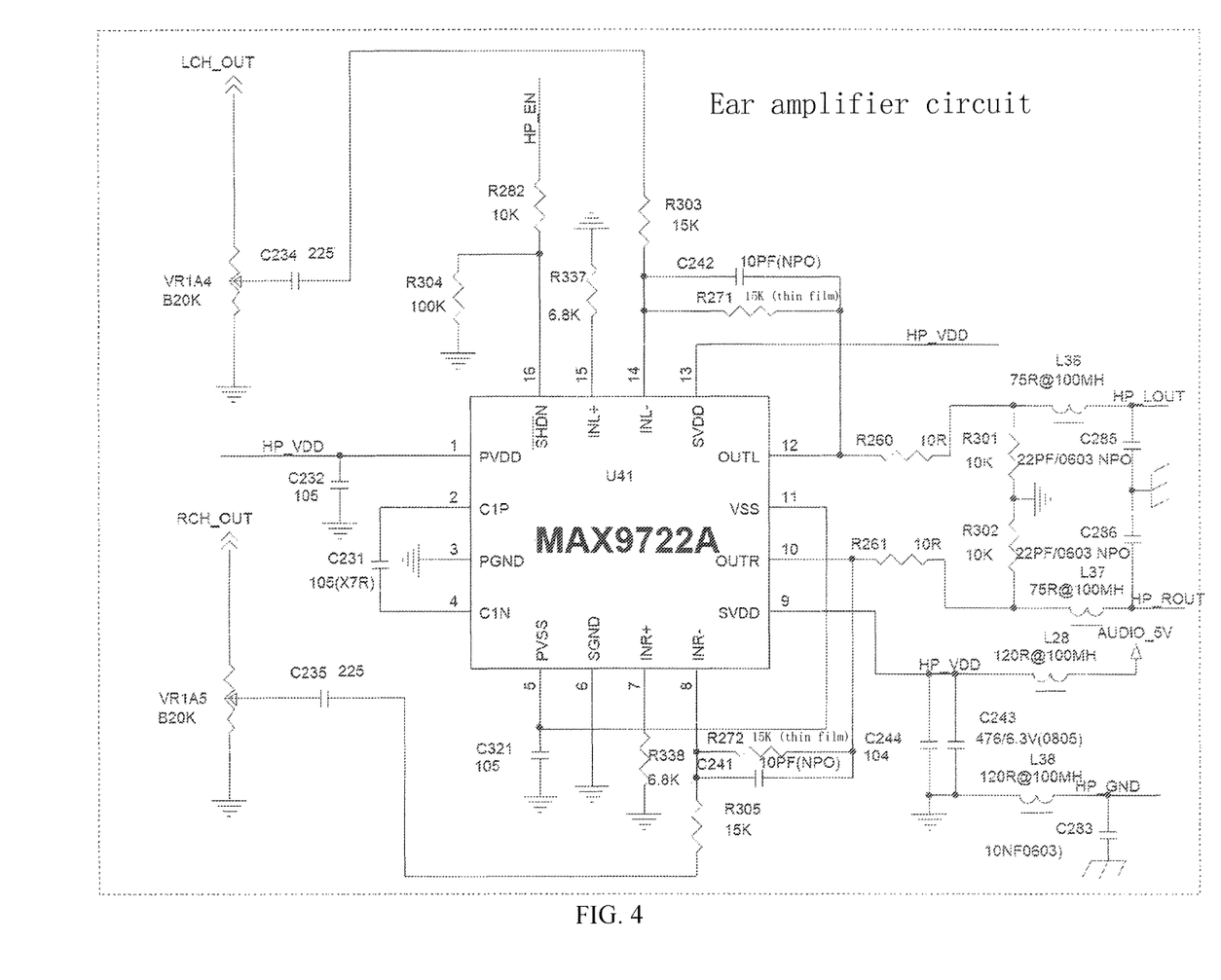
FIG. 4 is a schematic diagram of an ear amplifier circuit according to an embodiment of the present invention; and
FIG. 5A, FIG. 5B, FIG. 5C
Figure 5A:
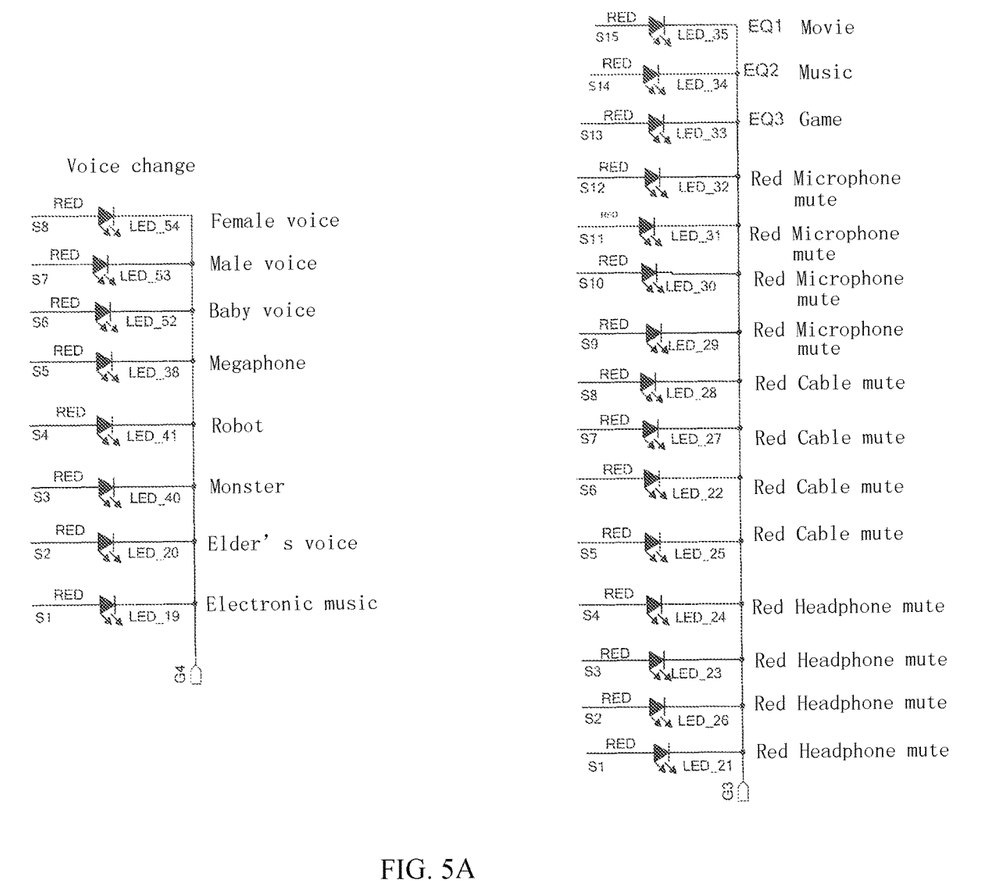
Figure 5B:
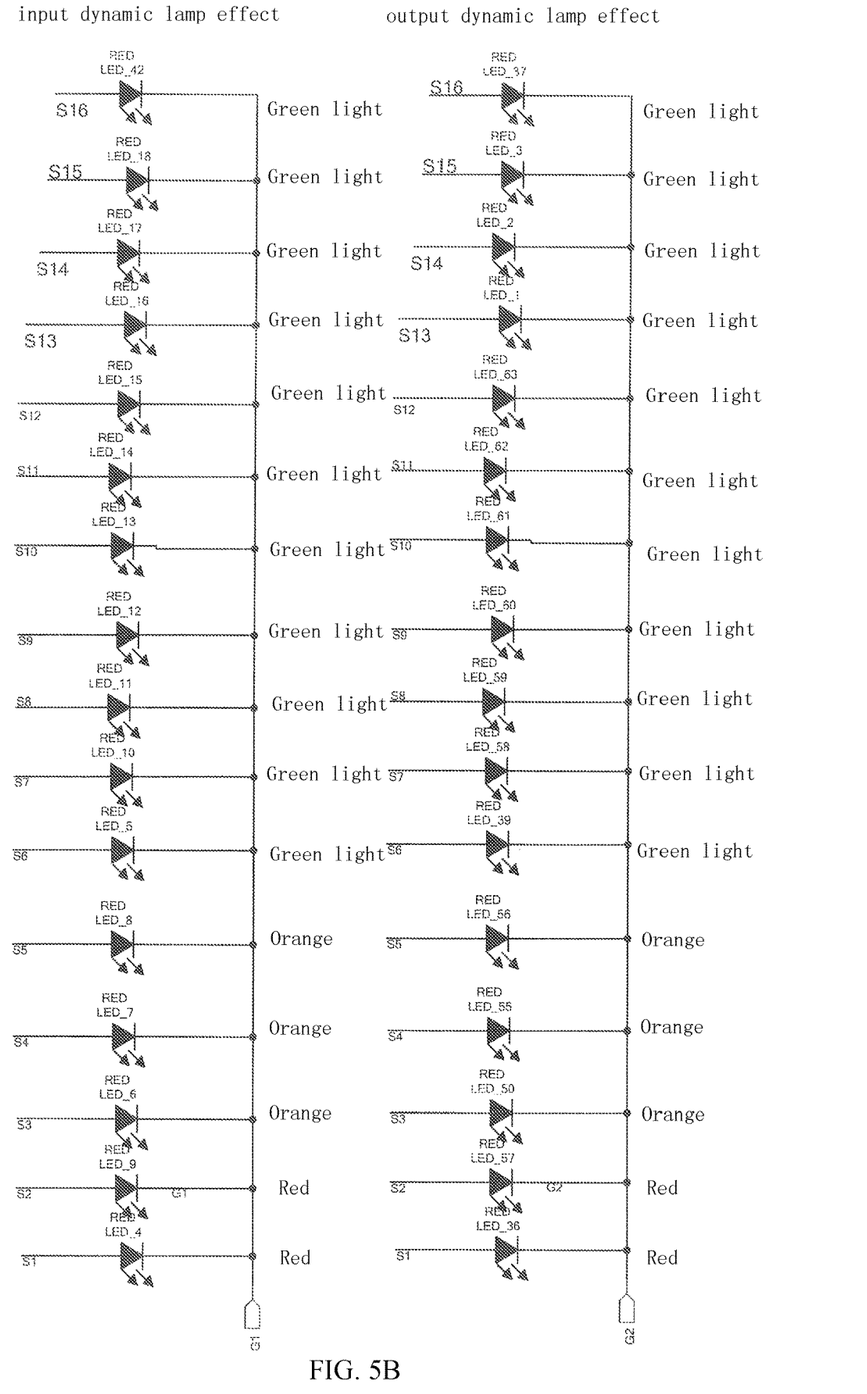
Figure 5C:
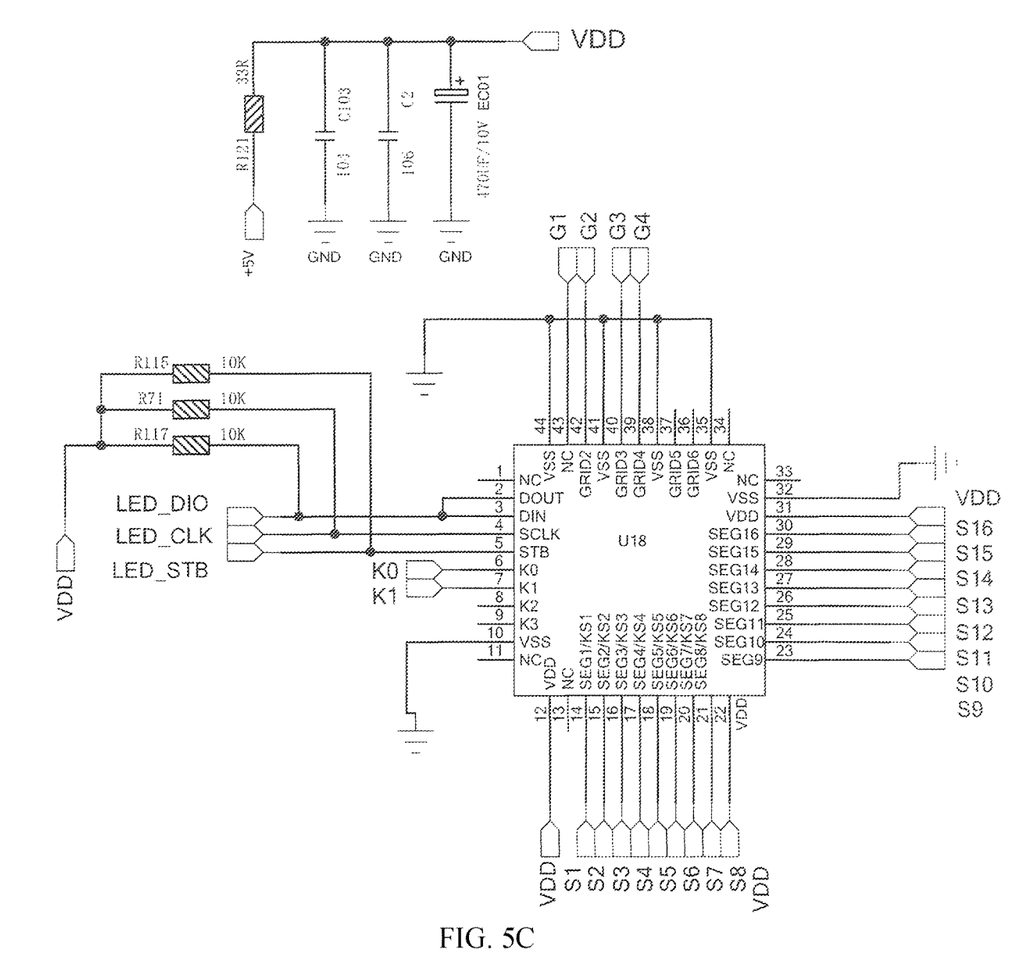
Figure 5D:
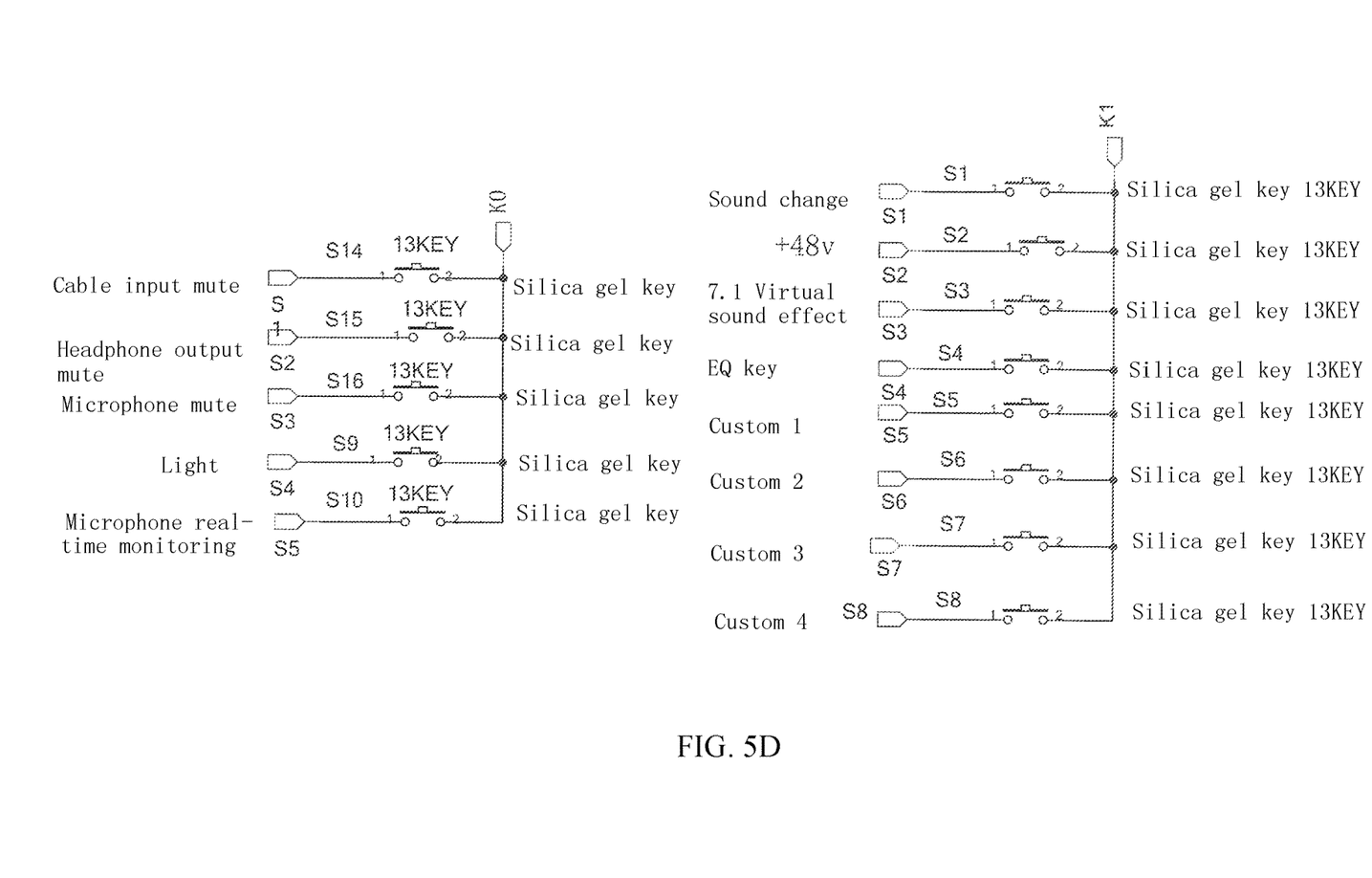
FIG. 5D is a schematic diagram of a microphone and lamp bead circuit according to an embodiment of the present invention.

In practice, the user connects the power cord to the TYPE-C socket 26, the console is turned on, and the device is ready for input and output. As shown in FIG. 3A and FIG. 3B, if the input device is a capacitor microphone, the phantom power key 172 is turned on to provide a voltage of 48 V for the capacitor microphone, and if the compound interface 21 accesses a dynamic microphone, the phantom power key 172 needs to be turned off: the input device can also be a wired headset and a wireless headset, where the wired headset is accessed via the headset interface 22, and the wireless headset is paired with the wireless communication module; audio can also be input through an analog audio in 23, and an optical in 25. The MIC knob 13 controls the input volume of the microphone and the headset input channel of the compound interface 21; the AUX knob 14 controls the input volume size of the optical fiber or analog audio in 23. In the process of microphone and headset input, one-button noise reduction can be turned on, and environmental noise such as loudspeaker noise can be shielded. For the input audio, sound can be changed via the VOICE key IS and different equalization modes can be switched through the EQ equalization key 174. When it is required to output audio, the CUSTOM key 16 can be clicked to pre-record the stored audio, such as common audio as "applause" and "scream"; audio output can be performed through a loudspeaker, a wired headphone and a wireless headphone; and output volume size can be adjusted through the compound knob 11 and the OUTPUT knob 12.

When playing computer games, a USB chip is used to realize the mapping of two output devices, and the output device names are respectively: the Game device, the Chat device and the compound knob 11 are Game and Chat volume ratio adjustment knobs; when playing a game on the network, the game background sound selects the Game device, and the teammate voice and sound output device selects the Chat device; and after such setting, the compound knob 11 can be used to adjust the ratio of the game background sound to the networked teammate sound, and the game background sound and the teammate networked voice sound can be freely adjusted. If the user wishes the background sound volume of the game to be large, the compound knob 11 is rotated in the direction of Game, so that the background sound is large and the voice sound is small; and if the user wishes the voice sound volume to be large, the compound knob 11 is rotated in the direction of Chat, so that the voice sound volume is large and the background sound volume of the game is small.

It will be understood that when an element is referred to as being "fixed to" another element, it can be directly on the other element or intervening elements may also be present. When an element is referred to as being "connected to" another element, it can be directly connected to the other element or there might be intervening elements at the same time. In contrast, when an element is referred to as being "directly" "on" another element, there are no intervening elements. The terms "vertical", "horizontal", "left", "right", and the like, as used herein, are for purposes of illustration only and are not intended to be exclusive embodiments. The terms "upper end", "lower end", "left side", "right side", "front end", "back end", and the like, as used herein, are positional relationships with reference to the figures.

Unless defined otherwise, all technical and scientific terms used herein have the same meaning as commonly understood by a person skilled in the art to which the present invention belongs. The terminology used herein in the description of the present invention herein is for the purpose of describing particular embodiments only and is not intended to be limiting of the present invention. As used herein, the term "and/or" includes any and all combinations of one or more of the associated listed items.

The foregoing embodiments are merely illustrative of the present invention and are not to be construed as limiting thereof. Various changes and modifications can be made by one skilled in the relevant art without departing from the spirit and scope of the invention. Accordingly, it is intended that all equivalents fall within the scope of the invention, and that the scope of the invention be defined by the claims.

What is claimed is:

1. A multi-functional console having a double sound card and a wireless noise reduction and video capture card, comprising a main chip, a control panel (1), a power supply unit and an interactive panel (2), wherein at least two sound cards are provided in the main chip which is successively connected to a microphone amplifier circuit and a microphone input circuit, and the microphone input circuit is connected to a noise reduction module, a wireless microphone receiving circuit and a compound interface (21); the control panel (1) is provided with a plurality of knobs, keys and indicator lamps electrically connected to the main chip, the interactive panel (2) is mounted with a plurality of input and output sockets electrically connected to the main chip, and the main chip is also connected to a storage module and a wireless communication module.

2. The multi-functional console having a double sound card and a wireless noise reduction and video capture card according to claim 1, wherein the main chip is electrically connected to a video capture chip, and the video capture chip is connected to a video input and output circuit.

3. The multi-functional console having a double sound card and a wireless noise reduction and video capture card according to claim 1, wherein an input dynamic indicator lamp (181) and an output dynamic indicator lamp (182) are provided at the top of the control panel (1) respectively for displaying an input volume size and an output volume size; a compound knob (11), an OUTPUT knob (12), a MIC knob (13) and an AUX knob (14) are provided on a left side of the control panel (1), the compound knob (11) adjusts outputs of two sound cards in an equal proportion and then outputs via an ear amplifier chip circuit, and the OUTPUT knob (12) controls the total output volume and mute; the MIC knob (13) controls the input volume of a microphone and a headset input channel; and the AUX knob (14) controls an input volume size of an optical fiber or an AUX cable.

4. The multi-functional console having a double sound card and a wireless noise reduction and video capture card according to claim 3, wherein the OUTPUT knob (12), the MIC knob (13) and the AUX knob (14) all have a one-key mute function, and mute and volume size indicator lamps are provided below the OUTPUT knob (12), the MIC knob (13) and the AUX knob (14).

5. The multi-functional console having a double sound card and a wireless noise reduction and video capture card according to claim 1, wherein an upper right side of the control panel (1) is provided with a VOICE key (15) for switching a voice-changing effect, and the VOICE key (15) surrounds a plurality of sound-changing indicator lamps (183).

6. The multi-functional console having a double sound card and a wireless noise reduction and video capture card according to claim 1, wherein a lower right side of the control panel (1) is provided with a CUSTOM key (16), a MIC key (171), a phantom power key (172), a virtual key (173) and an EQ equalization key (174), wherein the CUSTOM key (16) is provided with a plurality of keys for recording and playing back audio, the MIC key (171) is used for monitoring a microphone input, the phantom power key (172) is used for switching power supply and power interruption to a compound interface (21), the virtual key (173) is used for controlling virtual output sound effects of a headphone and a headset out, the EQ equalization key (174) is used for switching an EQ mode, and a mode indicator lamp (184) is provided beside the EQ equalization key (174).

7. The multi-functional console having a double sound card and a wireless noise reduction and video capture card according to claim 1, wherein a shift switch (211) is provided beside the compound interface (21) of the interactive panel (2) for switching inputs of the capacitor microphone and the dynamic microphone; the interactive panel (2) is further provided with a headset interface (22), an analog audio in (23), an analog audio out (24), an optical in (25), a TYPE-C socket (26), a toggle switch (27) and a light key (28); the optical in (25) is used for connecting the PS4 and the TV; the TYPE-C socket (26) is used for supplying power; and the toggle switch (27) is used for switching a double sound card mode and a single sound card mode of a sound card.

8. The multi-functional console having a double sound card and a wireless noise reduction and video capture card according to claim 1, wherein the noise reduction module is provided with a noise reduction key, and the noise reduction module performs filtering processing according to electrical signal of a microphone input circuit for reducing and filtering environmental noise and loudspeaker sound.

9. The multi-functional console having a double sound card and a wireless noise reduction and video capture card according to claim 1, wherein the multi-functional console is also provided with a plurality of LED lamps connected to the lamp control chip and having a RGB ambient lamp effect.

* * * * *